United States Patent
Okubo

(10) Patent No.: US 10,674,092 B2
(45) Date of Patent: Jun. 2, 2020

(54) IMAGE PROCESSING APPARATUS AND METHOD, AND IMAGE CAPTURING APPARATUS

(71) Applicant: CANON KABUSHIKI KAISHA, Tokyo (JP)

(72) Inventor: Toshiyuki Okubo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/204,421

(22) Filed: Nov. 29, 2018

(65) Prior Publication Data
US 2019/0182414 A1    Jun. 13, 2019

(30) Foreign Application Priority Data
Dec. 13, 2017    (JP) ................................ 2017-238916

(51) Int. Cl.
*H04N 5/235* (2006.01)
*H04N 5/232* (2006.01)

(52) U.S. Cl.
CPC ......... *H04N 5/2355* (2013.01); *H04N 5/2353* (2013.01); *H04N 5/23229* (2013.01); *H04N 5/23245* (2013.01)

(58) Field of Classification Search
CPC ............. H04N 5/2355; H04N 5/23245; H04N 5/2353; H04N 5/23229
See application file for complete search history.

(56) References Cited

U.S. PATENT DOCUMENTS

| 9,936,144 B2 | 4/2018 | Hatakeyama | |
| 2010/0265357 A1* | 10/2010 | Liu | G06T 5/50 348/223.1 |
| 2014/0347519 A1* | 11/2014 | Yamamoto | H04N 5/235 348/231.99 |
| 2015/0054965 A1* | 2/2015 | Sudo | H04N 5/23219 348/169 |
| 2015/0206296 A1* | 7/2015 | Hosono | H04N 1/6027 382/260 |

(Continued)

FOREIGN PATENT DOCUMENTS

JP    2016-076869 A    5/2016

OTHER PUBLICATIONS

Blend modes—Wikipedia, retrieved from https://en.wikipedia.org/wiki/Blend_modes on Oct. 26, 2019 (Year: 2019).*

*Primary Examiner* — Timothy J Henn
(74) *Attorney, Agent, or Firm* — Venable LLP

(57) ABSTRACT

An image processing apparatus comprises an acquisition unit that acquires images of a plurality of continuous frames obtained by shooting a subject; and a synthesis unit which generates a second image by performing lighten composite on first images of a plurality of continuous frames acquired with a first exposure amount out of the plurality of frames of images, acquires a fourth image by performing gain processing on a third image acquired with a second exposure amount which is lower than the first exposure amount so that the fourth image has a same exposure level as the first images, and generates a composite image showing a trail of the subject by performing lighten composite on a difference image, obtained by subtracting the fourth image from the second image, and the third image.

20 Claims, 12 Drawing Sheets

(56) References Cited

U.S. PATENT DOCUMENTS

| | | | |
|---|---|---|---|
| 2015/0229823 A1* | 8/2015 | Yasutomi | G09G 5/393 |
| | | | 348/216.1 |
| 2016/0105596 A1 | 4/2016 | Hatakeyama | |
| 2017/0134666 A1* | 5/2017 | Liu | H04N 5/232 |
| 2017/0140239 A1* | 5/2017 | Saito | G06T 7/246 |
| 2017/0269187 A1* | 9/2017 | Ikeda | H04N 5/2173 |
| 2018/0260944 A1* | 9/2018 | Okubo | G06T 5/50 |
| 2019/0251683 A1* | 8/2019 | Safdarnejad | H04N 5/2355 |

\* cited by examiner

IMAGE PROCESSING APPARATUS AND METHOD, AND IMAGE CAPTURING APPARATUS

BACKGROUND OF THE INVENTION

Field of the Invention

The present invention relates to an image processing apparatus and method, and an image capturing apparatus, and in particular, to an image processing apparatus and method for combining a plurality of images and to an image capturing apparatus.

Description of the Related Art

In recent years, image capturing apparatuses such as home video cameras and digital still cameras have been widely used. These image capturing apparatuses have a function of allowing users to check captured images on the spot, which improves the convenience of shooting for users.

In addition, since the sensitivity as well as the S/N ratio of an image sensor of a compact digital camera have been improved, there are models having a mode capable of easily shooting the starry sky. The mode includes a mode for shooting full-scale starry sky, and a mode for taking a star trail picture of the diurnal motion of stars which move with lapse of time.

In order to shoot an image of many stars, it is necessary to increase exposure time and sensitivity. However, there is a problem in which, if the exposure is adjusted so as to be suitable for shooting the stars, the buildings and night sky that constitute the background of an image become bright, and the atmosphere of the scene will be lost. Accordingly, Japanese Patent Laid-Open No. 2016-76869 proposes a method for shooting an image with appropriate brightness respectively for stars, a building and night sky.

However, if shooting the trajectory of a starry sky with the method of Japanese Patent Laid-Open No. 2016-76869, since only the stars whose luminance is within a predetermined range are extracted and synthesized, there is a problem in which very bright stars and dark stars cannot be synthesized.

SUMMARY OF THE INVENTION

The present invention has been made in consideration of the above situation, and obtains an image of a trail of a luminous subject such as a star and a subject other than the trail with brightness suitable for each subject.

According to the present invention, provided is an image processing apparatus comprising: an acquisition unit that acquires images of a plurality of continuous frames obtained by shooting a subject; and a synthesis unit that generates a composite image showing a trail of the subject by synthesizing the plurality of frames of images acquired by the acquisition unit, wherein the synthesis unit generates a second image by performing lighten composite on first images of a plurality of continuous frames acquired with a first exposure amount out of the plurality of frames of images; acquires a fourth image by performing gain processing on a third image acquired with a second exposure amount which is lower than the first exposure amount so that the fourth image has a same exposure level as the first images; and generates the composite image by performing lighten composite on a difference image, obtained by subtracting the fourth image from the second image, and the third image, and wherein each unit is implemented by one or more processors, circuitry or a combination thereof.

Further, according to the present invention, provided is an image processing apparatus comprising: an acquisition unit that acquires images of a plurality of continuous frames obtained by shooting a subject; and a synthesis unit that generates a composite image showing a trail of the subject by synthesizing the plurality of frames of images acquired by the acquisition unit, wherein the synthesis unit generates a second image by performing lighten composite on first images of a plurality of continuous frames acquired with a first exposure amount out of the plurality of frames of images; acquires a fourth image by performing gain processing on a third image acquired with a second exposure amount which is lower than the first exposure amount so that the fourth image has a same exposure level as the first images; obtains a mask image by extracting a pixel whose luminance exceeds a predetermined level from a difference image obtained by subtracting the fourth image from the second image; and generates the composite image by replacing an area of the third image masked by the mask image by the fourth image, and wherein each unit is implemented by one or more processors, circuitry or a combination thereof.

Furthermore, according to the present invention, provided is an image capturing apparatus comprising: an image sensor that converts an optical image into electric signal and outputs an image; an image processing apparatus comprising an acquisition unit that acquires images of a plurality of continuous frames obtained by shooting a subject; and a synthesis unit that generates a composite image showing a trail of the subject by synthesizing the plurality of frames of images acquired by the acquisition unit; and a setting unit that sets an exposure amount, wherein the synthesis unit generates a second image by performing lighten composite on first images of a plurality of continuous frames acquired with a first exposure amount out of the plurality of frames of images; acquires a fourth image by performing gain processing on a third image acquired with a second exposure amount which is lower than the first exposure amount so that the fourth image has a same exposure level as the first images; and generates the composite image by performing lighten composite on a difference image, obtained by subtracting the fourth image from the second image, and the third image, wherein the acquisition unit acquires the plurality of frames of images from the image sensor, and wherein each unit is implemented by one or more processors, circuitry or a combination thereof.

Further, according to the present invention, provided is an image processing method comprising: acquiring images of a plurality of continuous frames obtained by shooting a subject; and generating a second image by performing lighten composite on first images of a plurality of continuous frames acquired with a first exposure amount out of the plurality of frames of images; acquiring a fourth image by performing gain processing on a third image acquired with a second exposure amount which is lower than the first exposure amount so that the fourth image has a same exposure level as the first images; and generating a composite image showing a trail of the subject by performing lighten composite on a difference image, obtained by subtracting the fourth image from the second image, and the third image.

Further, according to the present invention, provided is an image processing method comprising: acquiring images of a plurality of continuous frames obtained by shooting a subject; and generating a second image by performing lighten composite on first images of a plurality of continuous frames acquired with a first exposure amount out of the plurality of frames of images; acquiring a fourth image by performing gain processing on a third image acquired with a second exposure amount which is lower than the first exposure amount so that the fourth image has a same exposure level as the first images; obtaining a mask image by extracting a pixel whose luminance exceeds a predetermined level from a difference image obtained by subtracting the fourth image from the second image; and generating a composite image showing a trail of the subject by replacing an area of the third image masked by the mask image by the fourth image.

Further, according to the present invention, provided is a non-transitory storage medium readable by a computer, the storage medium storing a program that is executable by the computer, wherein the program includes program code for causing the computer to function as an image processing apparatus comprising: an acquisition unit that acquires images of a plurality of continuous frames obtained by shooting a subject; and a synthesis unit that generates a composite image showing a trail of the subject by synthesizing the plurality of frames of images acquired by the acquisition unit, wherein the synthesis unit generates a second image by performing lighten composite on first images of a plurality of continuous frames acquired with a first exposure amount out of the plurality of frames of images; acquires a fourth image by performing gain processing on a third image acquired with a second exposure amount which is lower than the first exposure amount so that the fourth image has a same exposure level as the first images; and generates the composite image by performing lighten composite on a difference image, obtained by subtracting the fourth image from the second image, and the third image.

Further, according to the present invention, provided is a non-transitory storage medium readable by a computer, the storage medium storing a program that is executable by the computer, wherein the program includes program code for causing the computer to function as an image processing apparatus comprising: an acquisition unit that acquires images of a plurality of continuous frames obtained by shooting a subject; and a synthesis unit that generates a composite image showing a trail of the subject by synthesizing the plurality of frames of images acquired by the acquisition unit, wherein the synthesis unit generates a second image by performing lighten composite on first images of a plurality of continuous frames acquired with a first exposure amount out of the plurality of frames of images; acquires a fourth image by performing gain processing on a third image acquired with a second exposure amount which is lower than the first exposure amount so that the fourth image has a same exposure level as the first images; obtains a mask image by extracting a pixel whose luminance exceeds a predetermined level from a difference image obtained by subtracting the fourth image from the second image; and generates the composite image by replacing an area of the third image masked by the mask image by the fourth image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. In the present embodiment, explanation will be made in a case where the present invention is applied to a digital camera. It should be noted that the dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
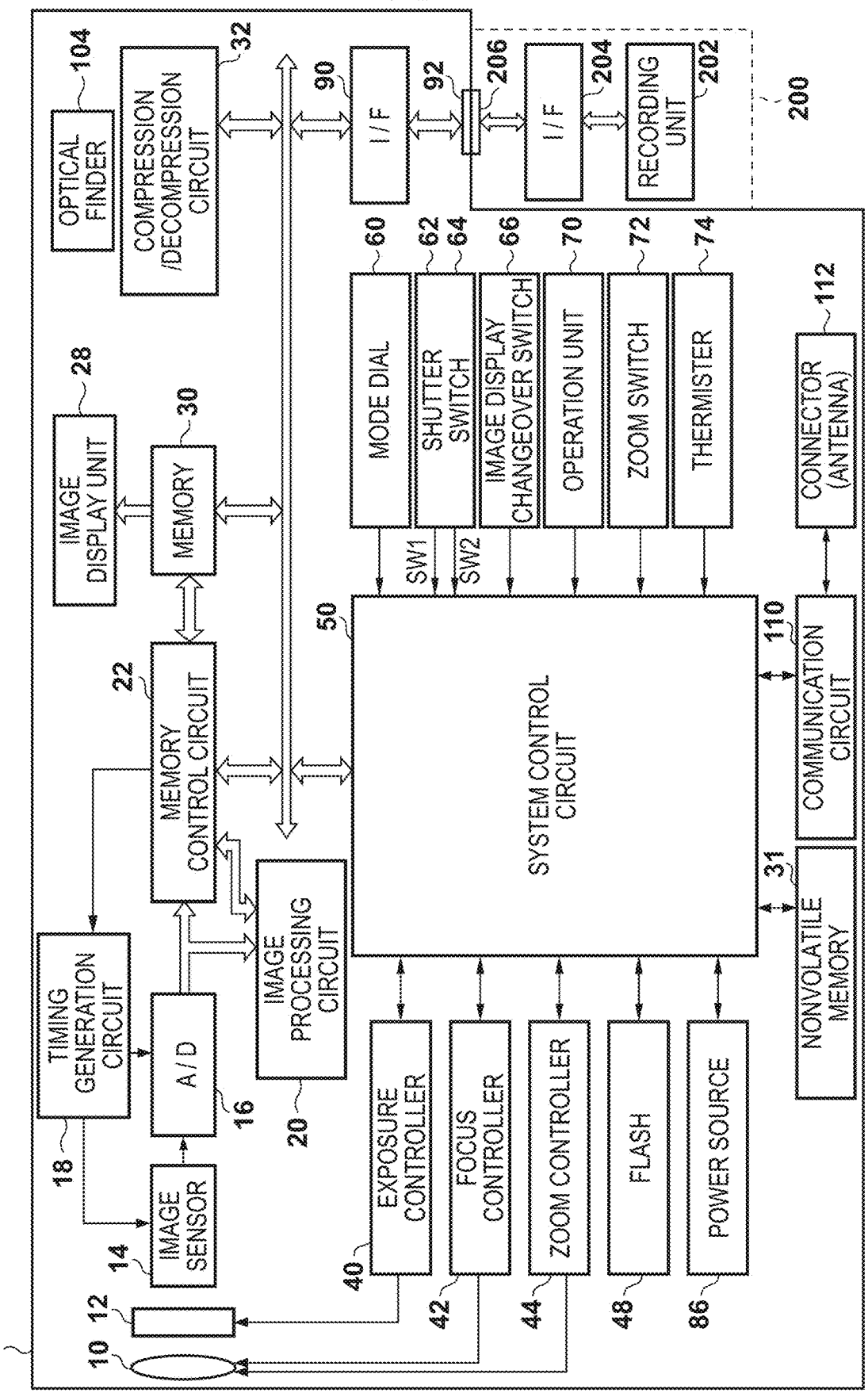
FIG. 1 is a block diagram illustrating a configuration of image capturing apparatus according to an embodiment.

FIG. 1 is a block diagram illustrating a configuration of a digital camera as an example of an image capturing apparatus having an image processing function according to an embodiment.

In FIG. 1, reference numeral 100 denotes an image capturing apparatus; 10, an image shooting lens; 12, a mechanical shutter having an aperture function; 14, an image sensor for converting an optical image into an electric signal; and 16, an A/D converter that converts an analog signal output from the image sensor 14 to a digital signal.

A timing generation circuit 18 supplies a clock signal and a control signal to the image sensor 14 and the A/D converter 16, and is controlled by a memory control circuit 22 and a system control circuit 50. Other than using the mechanical shutter 12, an accumulation time of the image sensor 14 can be controlled by using an electronic shutter which is realized by controlling a reset timing of the image sensor 14 by the timing generation circuit 18. The electronic shutter can be used for shooting a moving image and the like.

An image processing circuit 20 performs predetermined pixel interpolation processing and color conversion processing on data from the A/D converter 16 or data from the memory control circuit 22. Further, the image processing circuit 20 performs cropping and scaling processing on an image, thereby realizing an electronic zoom function. Further, the image processing circuit 20 performs predetermined arithmetic processing using image data output from the A/D converter 16. Then, based on the obtained calculation results, the system control circuit 50 performs through-the-lens (TTL) auto focus (AF) processing, auto exposure (AE) processing, pre-flash (EF) processing with respect to an exposure controller 40 and a focus controller 42. In addition, the image processing circuit 20 performs predetermined arithmetic processing using the image data output from the A/D converter 16 and also performs TTL auto white balance (AWB) processing based on the obtained calculation results.

The memory control circuit 22 controls the A/D converter 16, the timing generation circuit 18, the image processing circuit 20, a memory 30, and a compression/decompression circuit 32. The image data output from the A/D converter 16 is written into the memory 30 via the image processing circuit 20 and the memory control circuit 22, or directly via the memory control circuit 22.

An image display unit 28 comprises a TFT Liquid Crystal Display (LCD) or the like, and image data for display written in the memory 30 is displayed in the image display unit 28. By sequentially displaying captured image data using the image display unit 28, an electronic finder (EVF) function can be realized. In addition, the image display unit 28 can arbitrarily turn on/off its display according to an instruction from the system control circuit 50, and when the display is turned off, it is possible to greatly reduce the power consumption of the image capturing apparatus 100.

The memory 30 is used for storing captured still images and a moving image, and has a sufficient storage capacity for storing a predetermined number of still images and a moving image for a predetermined period. In sequential image sensing to sequentially capture a plurality of still images or a panoramic image, a large amount of image data can be written into the memory 30 at a high speed. Further, the memory 30 may be used as a work area for the system control circuit 50.

The system control circuit 50 controls the entire image capturing apparatus 100. A nonvolatile memory 31 is constituted by a Flash ROM or the like, and the program code executed by the system control circuit 50 is written in the nonvolatile memory 31, and the system control circuit 50 executes the program code while sequentially reading it out. An area for storing system information and an area for storing user setting information are provided in the nonvolatile memory 31, and various information and settings are read out and restored at the next startup.

The compression/decompression circuit 32 compresses or decompresses image data using a known compression method such as adaptive discrete cosine transform (ADCT). The compression/decompression circuit 32 reads the image stored in the memory 30, performs compression processing or decompression processing, and writes the processed data in the memory 30.

The exposure controller 40 controls the shutter 12 having the diaphragm function. The exposure controller 40 also has a flash dimming function by interlocking with a flash 48. The focus controller 42 controls the focusing of the imaging lens 10, and a zoom controller 44 controls the zooming of the imaging lens 10.

The flash 48 has an AF auxiliary light projection function and a flash dimming function. The exposure controller 40 and the focus controller 42 are controlled using the TTL method. As described above, the system control circuit 50 controls the exposure controller 40 and the focus controller 42 based on the calculation result obtained by performing arithmetic processing on the image data from the A/D converter 16 by the image processing circuit 20.

Operation means 60, 62, 64, 66, 70 and 72 are used for inputting various operation instructions to the system control circuit 50, and comprise a single or plurality of combinations of switches, dials, touch panels, a device for pointing by line-of-sight detection, a voice recognition device, and the like. Here, the operation means will be described in more detail.

A mode dial switch 60 can turn off the power, and can switch and set various function modes, such as an automatic image shooting mode, an image shooting mode, a panoramic image shooting mode, a moving image recording mode, a playback mode, and a PC connection mode.

A shutter switch SW1 (62) is turned on during operation of a shutter button (not shown), and instructs start of operation such as AF processing, AE processing, AWB processing and the like.

The shutter switch SW2 (64) is turned on when the shutter button (not shown) is completely operated (for example, fully pressed), and instructs start of a series of processes including a readout process, a developing process, and a recording process. In the readout process, in the case of flash photography, after performing the EF process, the image sensor 14 is exposed for an exposure period determined by an AE process, the flash 48 is caused to emit light during the exposure period, and the exposure controller 40 controls to shield the image sensor 14 from light at the same time when the exposure period has elapsed, thereby terminating the exposure of the image sensor 14. Then, a signal read out from the image sensor 14 is written in the memory 30 as image data via the A/D converter 16 and the memory control circuit 22. Then, the developing process is performed by using the arithmetic operation in the image processing circuit 20 and the memory control circuit 22. Furthermore, image data is read out from the memory 30, compression is performed by the compression/decompression circuit 32, and the recording process of writing image data on a recording medium 200 is performed.

An image display changeover switch 66 can set ON/OFF of the image display unit 28. With this function, in image sensing using an optical finder 104, power supply to the image display unit 28 can be cut to save power.

An operation unit 70 comprises various buttons, touch panels, and a rotary dial, and the like, and examples of the operation unit 70 include a menu button, a set button, a macro button, a multi-image playback/repaging button, a flash setting button, a single-shot/sequential/self-timer changeover button, a forward (+) menu item selection button, a backward (−) menu item selection button, a forward (+) playback image search button, a backward (−) playback image search button, an image capturing quality selection button, an exposure correction button, and a date/time set button.

A zoom switch 72 is used by the user to instruct a magnification change for an image to be captured. The zoom switch 72 includes a tele switch for changing an angle of view to the telephoto side and a wide switch for changing the angle of view to the wide angle side. This zoom switch 72 is used to provide a trigger for the zoom controller 44 to change the angle of view of the imaging lens 10 and perform optical zoom operation. It also provides a trigger for electronic zooming that changes the angle of view by performing cropping, pixel interpolation, or the like, on an image by the image processing circuit 20.

A thermistor 74 measures the temperature inside the image capturing apparatus 100. Since defective pixels of the image sensor 14 are affected by temperature, it is necessary to change defect correction processing depending on the temperature at the time of capturing an image. The thermistor 74 is placed near the image sensor 14 in the image capturing apparatus 100 and measures the temperature of the image sensor 14 itself.

A power source 86 comprises a primary battery such as an alkaline battery, a secondary battery such as an NiCd battery, an NiMH battery, or an Li-ion battery, an AC adapter, an external battery, or the like.

An interface 90 connects to a recording medium such as a memory card or a hard disk, and a connector 92 connects to a recording medium such as a memory card or a hard disk.

The optical viewfinder 104 enables performing image capturing using only the optical viewfinder function without using the electronic viewfinder function which uses the image display unit 28.

A communication circuit 110 has various communication functions such as USB, IEEE 1394, LAN, wireless communication, and the like. Reference numeral 112 denotes a connector or an antenna in the case of wireless communication for connecting the image capturing apparatus 100 to another device by the communication circuit 110.

The recording medium 200 is a recording medium such as a memory card or a hard disk. This recording medium 200 is provided with a recording unit 202 composed of a semiconductor memory, a magnetic disk, etc., an interface 204 with the image capturing apparatus 100, and a connector 206 for connecting with the image capturing apparatus 100.

Figure 2A:
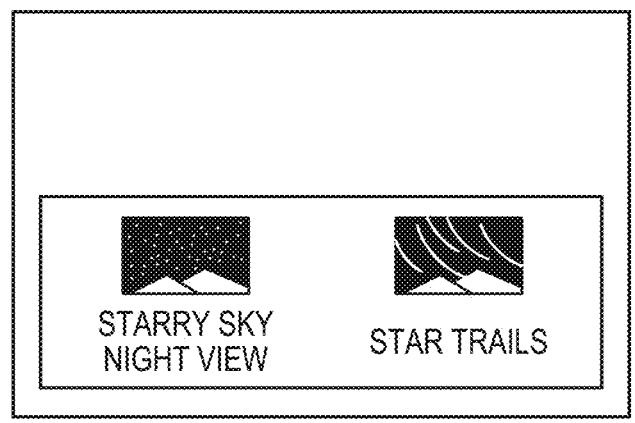
FIG. 2A shows a screen for selecting an image shooting mode for shooting a starry sky.

Next, image shooting processing and image processing performed in the image capturing apparatus 100 having the above configuration will be explained. FIG. 2A shows a screen for selecting image capturing modes of a starry sky. A user can select one of the image capturing modes of the starry sky by operating the operation unit 70. If the user wants to capture the starry sky without star trails in a shot image, a starry sky night view mode is to be selected, and if the user wants to capture the trails of stars, the star trail mode is to be selected, whereby the image capturing apparatus 100 can perform processing suitable for the purpose of a shot image. In this embodiment, processing when the star trail mode is selected will be explained. The system control circuit 50 writes mode information of the selected mode in the memory 30 to store the mode selected by the user.

Figure 2B:
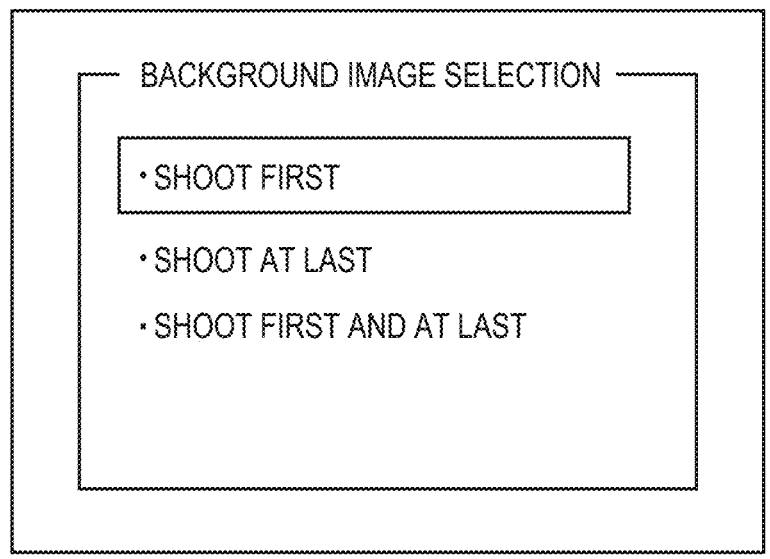
FIG. 2B shows a screen for selecting an image shooting timing of a background image according to the embodiment.

FIG. 2B shows a screen for selecting timing/timing of shooting background image/images upon shooting an image in the star trail mode. The user can select the timing/timings of shooting the background image/images in the star trail mode by operating the operation unit 70.

Figure 3:
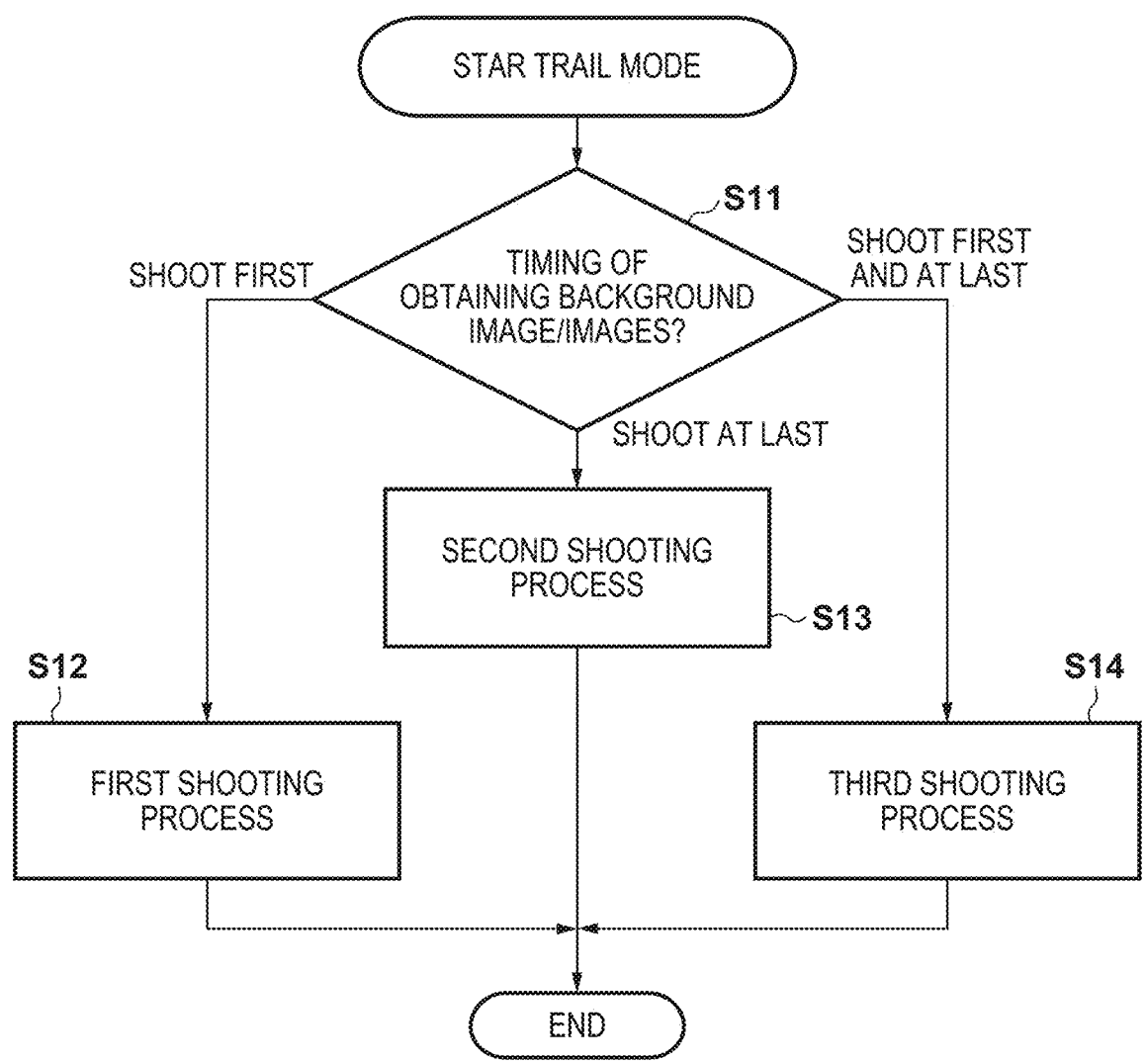
FIG. 3 is a flowchart showing processing in a star trail mode according to the embodiment.

When an image capturing instruction is issued when the user presses the shutter switch SW2 (64), the system control circuit 50 reads out the mode stored in the memory 30 and starts image shooting processing in the designated image shooting mode. When the designated image shooting mode is the star trail mode, the processing shown in FIG. 3 is started. In step S11, it is judged which one of the options shown in FIG. 2B has been selected. If "shoot first" is selected, the process proceeds to step S12 and a first shooting process, in which a background image is shot first at the start of the image shooting processing and then a trail image of continuous trails of stars is shot, is performed. When "shoot at last" is selected, the process advances to step S13 and a second shooting process, in which a trail image is shot first after the image shooting processing is started and then a background image is shot at last, is performed. When "shoot first and at last" is selected, the process proceeds to S14 and a third shooting process, in which the background image is shot first at the start of the image shooting processing, then a trail image is shot, and thereafter a background image is shot at last, is performed.

Details of the first shooting process, the second shooting process, and the third shooting process performed in steps S12, S13, and S14 will be described below with reference to FIGS. 4, 5, and 6, respectively.

Figure 4:
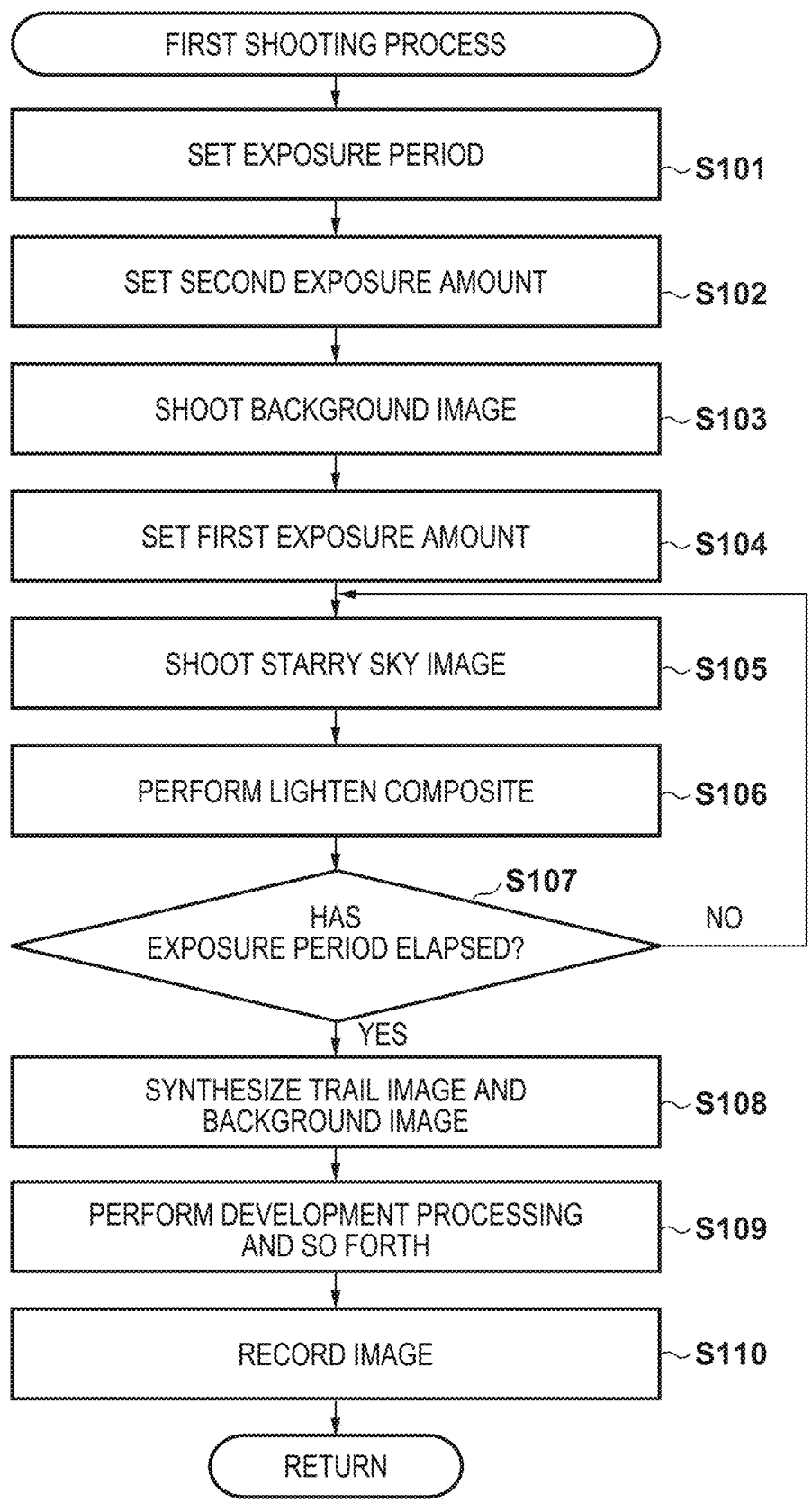
FIG. 4 is a flowchart showing a first shooting process in a case where a background image is shot first in the star trail mode according to the embodiment.

FIG. 4 is a flowchart showing the first shooting process performed in step S12 in FIG. 3. First, in step S101, a user is invited to set an exposure period. A long exposure period is set if the user wants to record long trails of stars, and a short exposure period is set if the user wants to record short trails of stars. Usually, the exposure period of 1 to 2 hours is often set. As the exposure period, a predetermined default exposure period or exposure period used for shooting in the previous star trail mode may be held, and the user may appropriately change the exposure period.

Next, in step S102, based on a photometric result, an aperture, a shutter speed and an ISO sensitivity suitable for shooting a background image are determined and set as a second exposure amount. Here, the second exposure amount is set lower than a first exposure amount suitable for shooting a starry sky image set in step S104 to be described later. Further, the second exposure amount is lowered by lowering the ISO sensitivity preferentially. In step S103, a background image is shot with the set second exposure amount.

Next, in step S104, the aperture, the shutter speed, and the ISO sensitivity suitable for shooting a starry sky image are determined based on the photometric result, and set as the first exposure amount. In step S105, the starry sky image is shot with the set first exposure amount. In step S106, if the shot starry sky image is the second or subsequent one, the starry sky images shot in the past are synthesized by performing lighten composite to generate a trail image. Since a known method can be used as a method for generating a trail image by lighten composite, a detailed explanation will be omitted here.

In step S107, it is determined whether or not the exposure period set in step S101 has elapsed since shooting started in step S105. If the exposure period has not elapsed yet, the process returns to step S105 and a process of generating a trail image is repeated by shooting a starry sky image in step S105 and generating a trail image by performing lighten composite in step S106. In this manner, starry sky images of a plurality of frames are synthesized and a trail image is acquired.

If the exposure period has elapsed, the process proceeds to step S108 where the trail image is synthesized with the background image, and in step S109, using the image processing circuit 20, image processing including development processing and offset correction is performed on the synthesized image. In step S110, the image processed in step S109 is written in the recording medium 200, and the process is terminated. The method of synthesizing the trail image and the background image performed in step S108 will be described later in detail with reference to FIG. 7.

Figure 5:
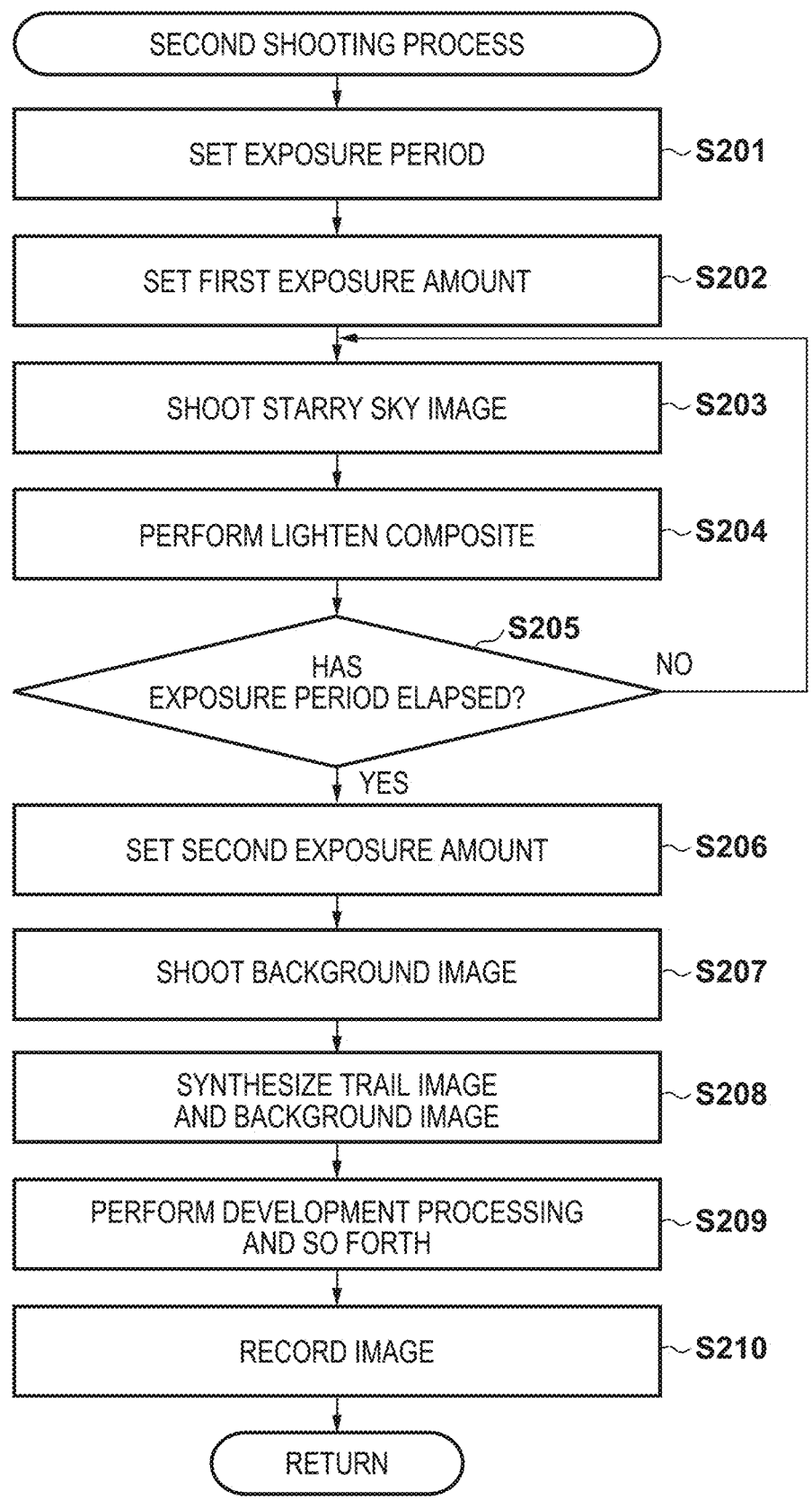
FIG. 5 is a flowchart showing a second shooting process in a case where a background image is shot at last in the star trail mode according to the embodiment.

FIG. 5 is a flowchart showing the second shooting process performed in step S13 in FIG. 3. First, in step S201, a user is invited to set an exposure period similarly to step S101. Next, in step S202, based on a photometric result, an aperture, a shutter speed and an ISO sensitivity suitable for shooting a starry sky image are determined and set as a first exposure amount. In step S203, the starry sky image is shot with the set first exposure amount. In step S204, if the shot starry sky image is the second or subsequent one, the starry sky images shot in the past are synthesized by performing lighten composite to generate a trail image similarly to step S106. In this manner, a trail image is acquired by synthesizing starry sky images of a plurality of frames.

In step S205, it is determined whether or not the exposure period set in step S201 has elapsed since shooting started in step S203. If the exposure period has not elapsed yet, the process returns to step S203 and a process of generating a trail image is repeated by shooting a starry sky image in step S203 and generating a trail image by performing lighten composite in step S204.

If the exposure period has elapsed, the process proceeds to step S206 where an aperture, a shutter speed and an ISO sensitivity suitable for shooting a background image are determined based on the photometric result similarly to step S102, and set as a second exposure amount. Then in step S207, a background image is shot with the set second exposure amount.

In step S208, the trail image is synthesized with the background image, and in step S209, using the image processing circuit 20, image processing including development processing and offset correction is performed on the synthesized image. In step S210, the image processed in step S209 is written in the recording medium 200, and the process is terminated. The method of synthesizing the trail image and the background image performed in step S208 will be described later in detail with reference to FIG. 7.

Figure 6:
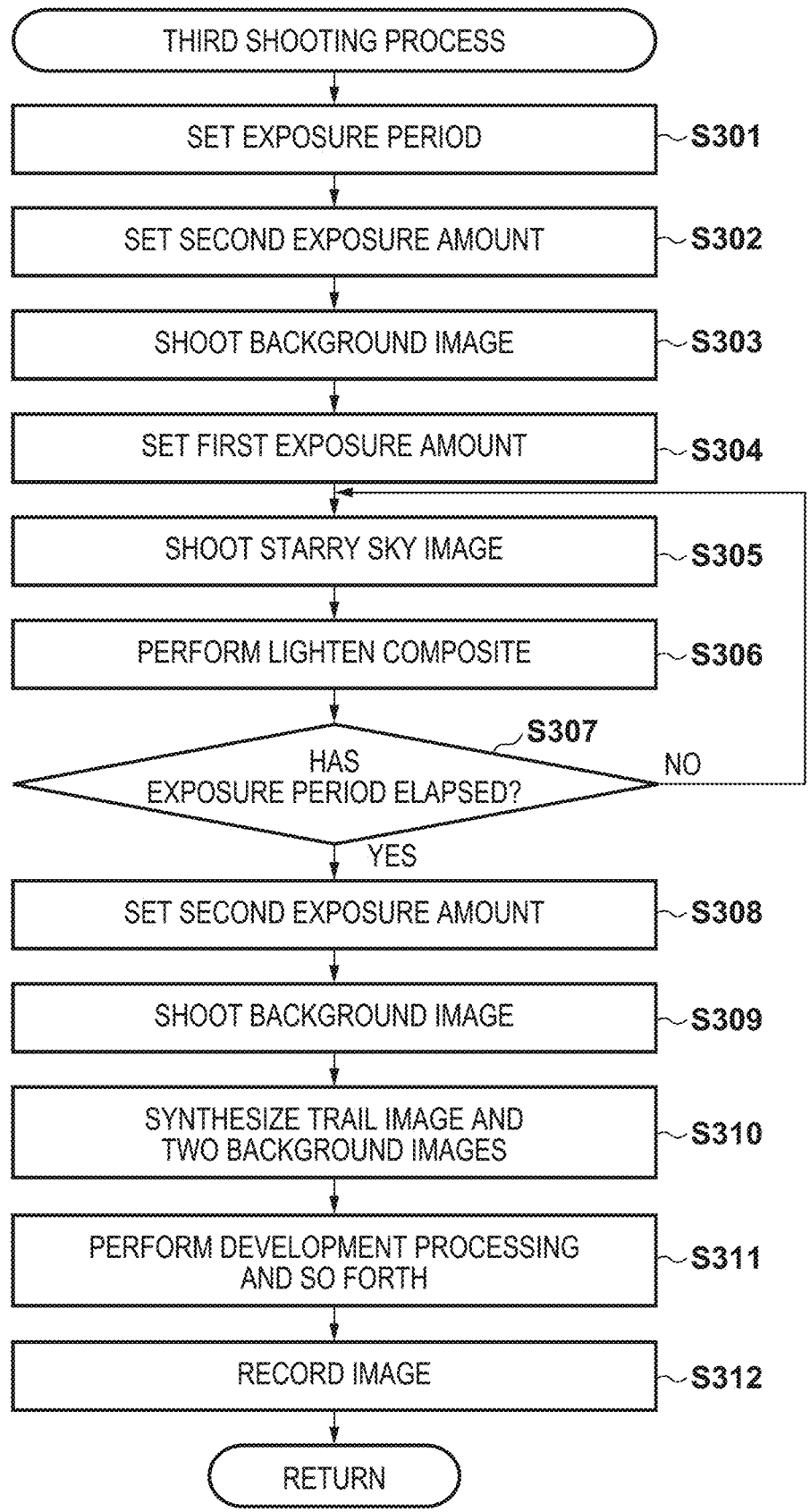
FIG. 6 is a flowchart showing a third shooting process in a case where a background image is shot first and at last in the star trail mode according to the embodiment.

FIG. 6 is a flowchart showing the third shooting process performed in step S14 in FIG. 3. First, in step S301, a user is invited to set an exposure period similarly to step S101. Next, in step S302, based on a photometric result, an aperture, a shutter speed and an ISO sensitivity suitable for shooting a background image are determined and set as a second exposure amount, and in step S303, a first background image is shot with the set second exposure amount.

Next, in step S304, the aperture, the shutter speed, and the ISO sensitivity suitable for shooting a starry sky image are determined based on the photometric result, and set as a first exposure amount. In step S305, the starry sky image is shot with the set first exposure amount. In step S306, if the shot starry sky image is the second or subsequent one, the starry sky images shot in the past are synthesized by performing lighten composite to generate a trail image similarly to step S106.

In step S307, it is determined whether or not the exposure period set in step S301 has elapsed since shooting started in step S305. If the exposure period has not elapsed yet, the process returns to step S305 and a process of generating a trail image is repeated by shooting a starry sky image in step S305 and generating a trail image by performing lighten composite in step S306. By this, a trail image is obtained by combining starry sky images for a plurality of frames.

If the exposure period has elapsed, the process proceeds to step S308 where the aperture, the shutter speed and the ISO sensitivity suitable for shooting a background image are set, and in step S309, a second background image is shot with the set second exposure amount.

In step S310, the trail image is synthesized with the two background images, and in step S311, using the image processing circuit 20, image processing including development processing and offset correction is performed on the synthesized image. In step S312, the image processed in step S311 is written in the recording medium 200, and the process is terminated. The method of synthesizing the trail image and the background image performed in step S310 will be described later in detail with reference to FIG. 8.

In the processing of the present embodiment shown in FIG. 6, both the first and last background images are shot with the second exposure amount, however, they may be shot with different exposure amounts. In that case, synthesis may be performed by taking account of the difference in exposure amounts.

Figure 7:
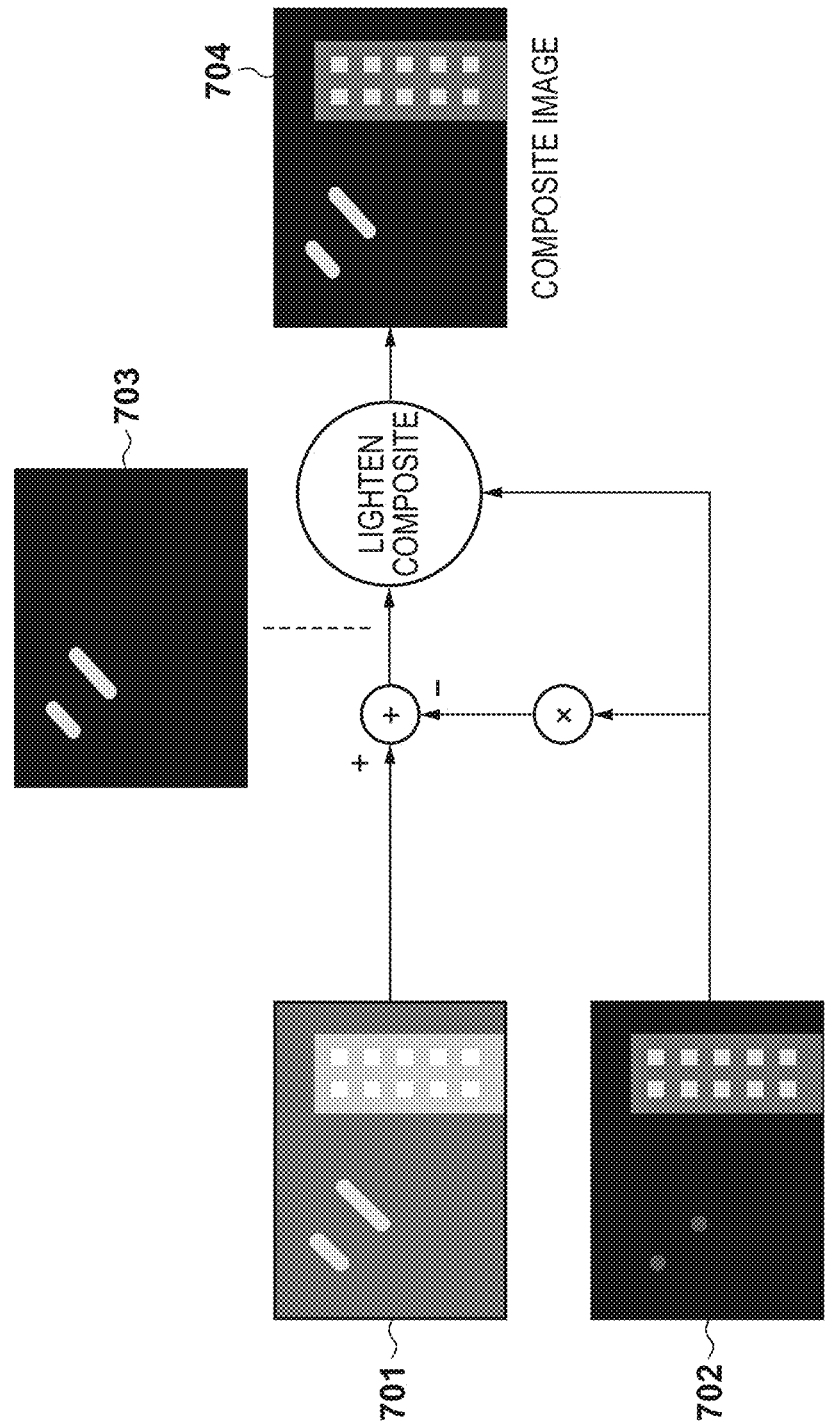
FIG. 7 is a diagram for explaining a method of combining a background image and a trail image in a case where "shoot first" or "shoot at last" is selected for shooting the background image according to the first embodiment.

FIG. 7 is a diagram for explaining a method of synthesizing the background image and the trail image, which is performed in step S108 in FIG. 4 or step S208 in FIG. 5. As shown in FIG. 7, in the trail image 701, since the exposure is adjusted for the stars, highlight-detail loss occurs in a background building, and the night sky is bright. On the other hand, in the background image 702, since the exposure is adjusted for buildings and the night sky, the stars are dark and unnoticeable.

Accordingly, in order to control the background image 702 to have the same exposure level as the trail image 701, the gain processing corresponding to the number of differences in exposure value is performed. For example, if the difference in exposure value is two between the first exposure amount used for shooting a starry sky and the second exposure amount used for shooting the background image, then the gain corresponding to the exposure value difference of two is applied. The noise increases by the gain processing, however, as the background image 702 is shot with the ISO sensitivity set lower than the trail image 701, the amount of noise is almost unchanged. After the gain processing, the background image 702 having undergone the gain processing is subtracted from the trail image 701, thereby obtaining a trail extraction image 703 (difference image) in which only the trails are extracted. Signal levels of pixels which become minus (less than 0) by the subtraction are clipped to 0.

Finally, by performing lighten composite on the background image 702 which does not undergo the gain processing and the trail extraction image 703, a final composite image 704 is obtained in which exposure of the starry sky and exposure of the background are both proper.

Figure 8:
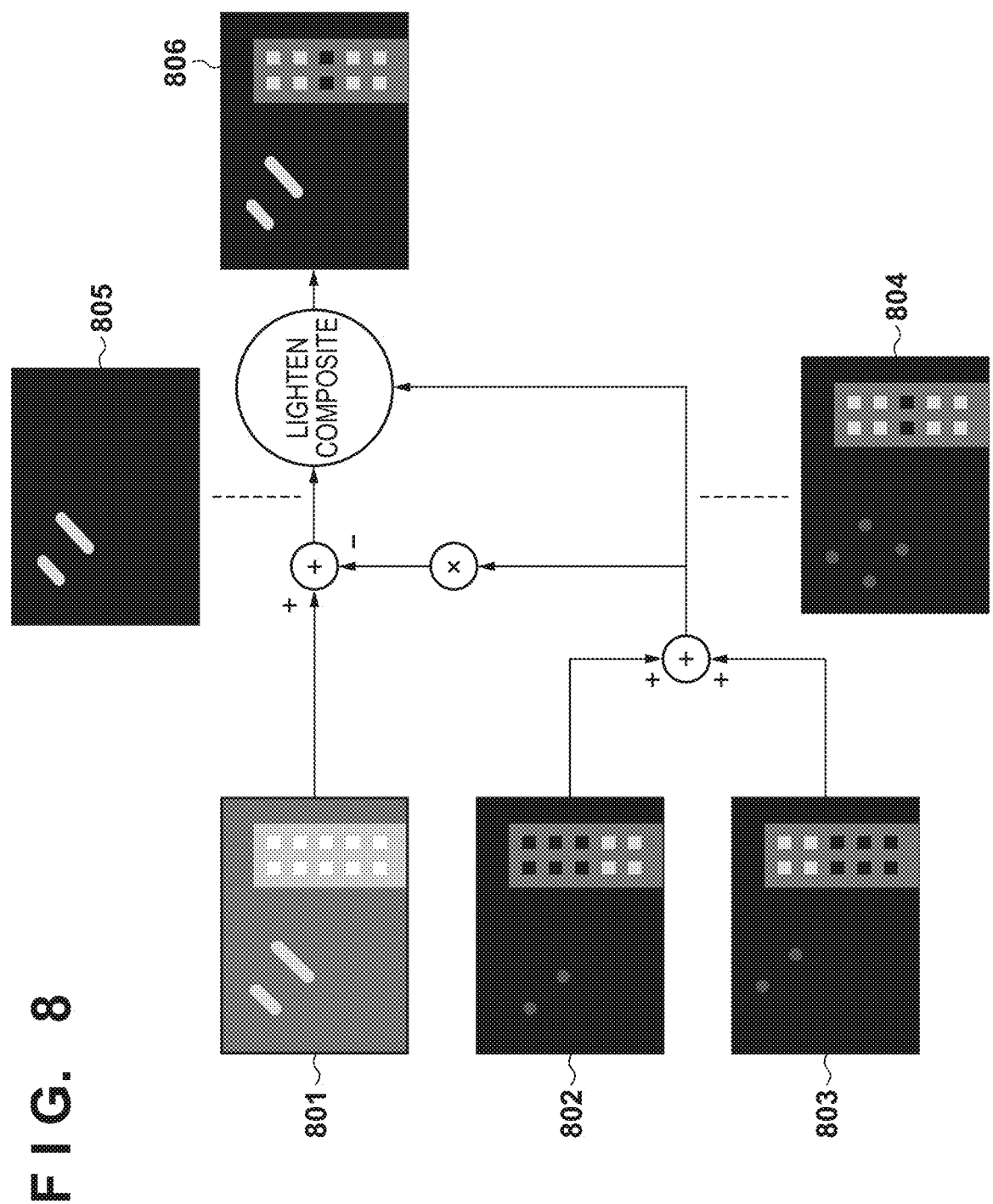
FIG. 8 is a diagram for explaining a method of combining background images and a trail image in a case where "shoot first and at last" is selected for shooting the background images according to the first embodiment.

FIG. 8 is a diagram for explaining a method of synthesizing the two background images and the trail image, which is performed in step S310 in FIG. 6. First, the two background images 802 and 803 shot first and at last are averaged, and a combined background image 804 is obtained. Then, in order to control the combined background image 804 to have the same exposure level as the trail image 801, the gain processing corresponding to the number of differences in exposure value is performed. For example, if the difference in exposure value is two between the first exposure amount used for shooting a starry sky and the second exposure amount used for shooting the background images, then the gain corresponding to the exposure value difference of two is applied. After the gain processing, the combined background image 804 undergone the gain processing is subtracted from the trail image 801, thereby obtaining a trail extraction image 805 (difference image) in which only the trails are extracted. Signal levels of pixels which become minus (less than 0) by the subtraction are clipped to 0.

Finally, by performing lighten composite on the combined background image 804 which does not undergo the gain processing and the trail extraction image 805, a final composite image 806 is obtained in which exposure of the starry sky and exposure of the background are both proper.

In the present embodiment, two background images are synthesized by averaging, however, other combining methods, such as lighten composite, darken composite, HDR synthesis, noise reduction synthesis, and so forth, may be used.

Figure 9:
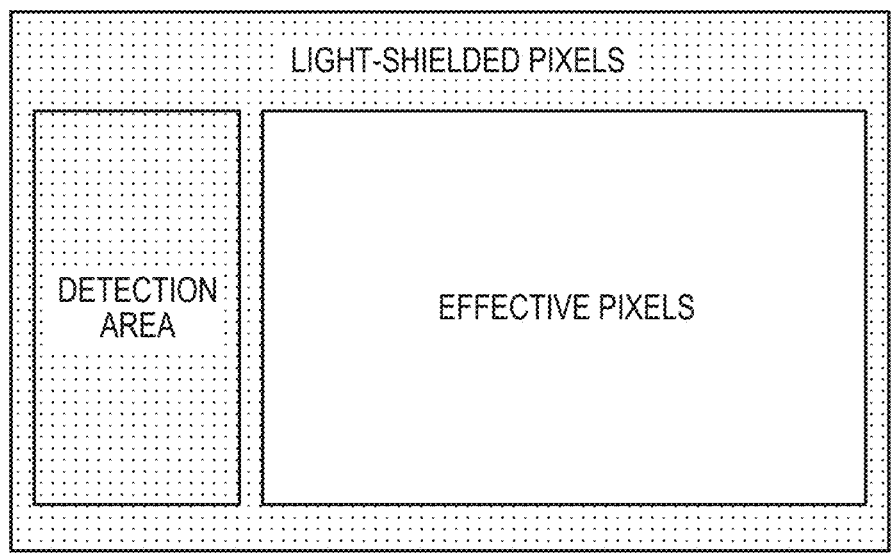
FIG. 9 is a diagram showing an offset correction region according to the embodiment.

FIG. 9 is a diagram showing an offset correction region. When the trail image obtained by lighten composite and the background image are added, the offset component of the signal sometimes shifts. In order to avoid this, an offset correction process is performed after the synthesis. The above synthesis processing is also performed on a pixel signal from a light-shielded pixel region, the state of the pixel signal from the light-shielded pixel region of the composite image is detected and offset correction is performed.

The pixel signals in a detection area in FIG. 9 are integrated and normalized to the level per pixel. After performing the normalization, the offset amount detected from the composite image is subtracted from the image to be recorded and a predetermined offset amount is added to the image.

According to the first embodiment as described above, it is possible to obtain an image in which the trails of stars in the starry sky, the buildings of the background and the night sky respectively have appropriate brightness by synthesis. Further, the image having the above feature can be obtained with simple control without increasing processing time by using a synthesis method which uses addition/subtraction and lighten composite.

It should be noted that, in the present embodiment, the description has been given by taking a starry sky as an example, but the preset invention can also be applied to a case of shooting a scene other than the starry sky. For example, the present invention can be effectively applied to the case of recording the trails of car light when shooting a night view, the case of shooting a moving subject, and so forth.

The offset correction may be performed irrespective of a color filter, but the color correction may be performed respectively for each color filter or performed after separating pixels according to the internal structure of the image sensor.

In addition, although still image shooting is explained to use the shutter 12, it may be performed using only electronic shutter without using the shutter 12.

<Modification>

In the case where "shoot first and at last" of the background image is selected, in the first embodiment described above, as described with reference to FIG. 8, the case of averaging a plurality of (two) background images is explained. On the other hand, one of the plurality of (two) background images may be selected and used for synthesis with a trail image. Processing in this modification will be described below.

Figure 10A:
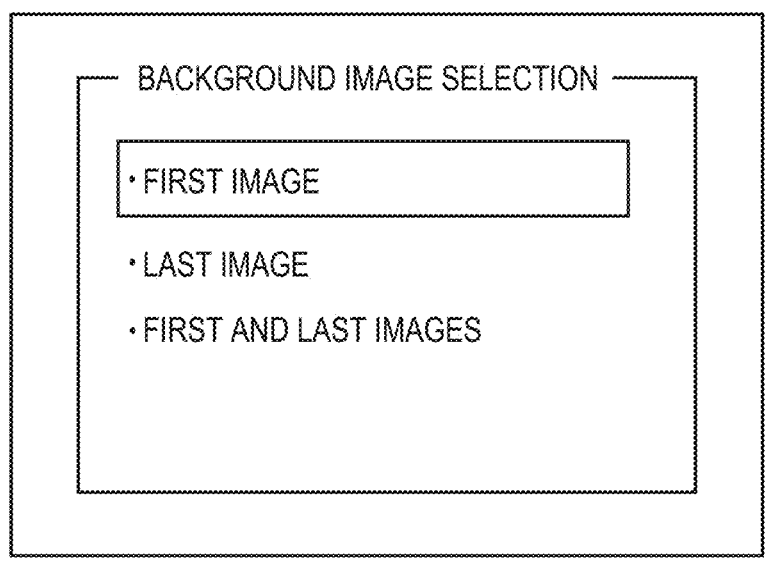
FIG. 10A is a diagram for explaining a method of combining a background image and a trail image according to a modification.
Figure 10B:
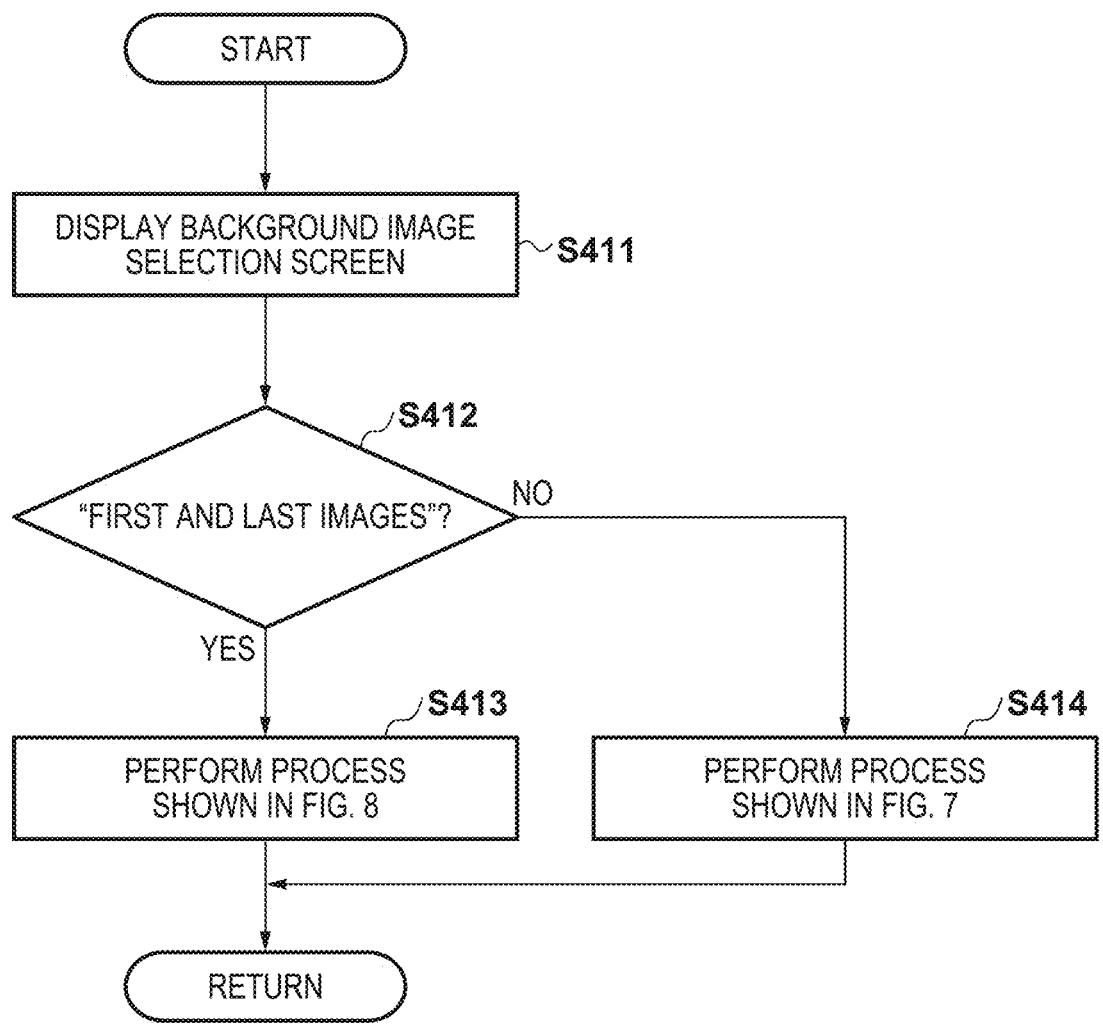
FIG. 10B is a flowchart showing a procedure of combining a background image and a trail image according to the modification.
Figure 10C:
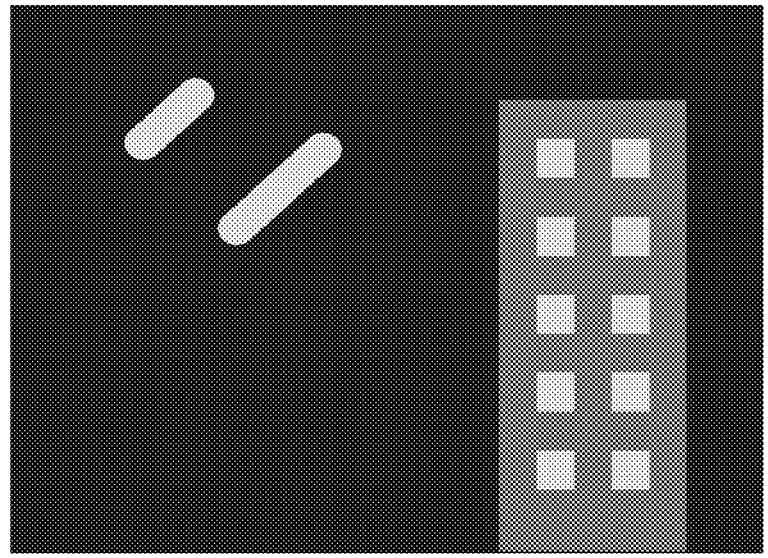
FIG. 10C is a diagram for explaining the method of combining a background image and a trail image according to the modification.

FIG. 10B is a flowchart showing a procedure for selecting an image to be synthesized, and it is executed in place of step S310 in FIG. 7 after a trail image and a plurality of background images are obtained. First, in step S411, a background image selection screen shown in FIG. 10A is displayed to invite a user to select. If it is determined in step S412 that "first image" or "last image" has been selected (NO in step S412), in step S414, the selected background image and the trail image are synthesized with the procedure described with reference to FIG. 7. FIG. 10C is a diagram showing an example of display when "first image" is selected. In this manner, the selected background image may be displayed in the final composite image.

If it is determined in step S412 that "first and last images" has been selected (YES in step S412), in step S413, the plurality of background images and the trail image are synthesized with the procedure described with reference to FIG. 8.

Instead of selecting a background image or images before synthesis, a plurality of types of final composite images may be generated according to the procedures shown in FIGS. 7 and 8, the plurality of obtained final composite images are displayed in a selection screen so that the user can select and store a favorite image. Alternatively, all of the generated plurality of types of final composite images may be stored.

Figure 11:
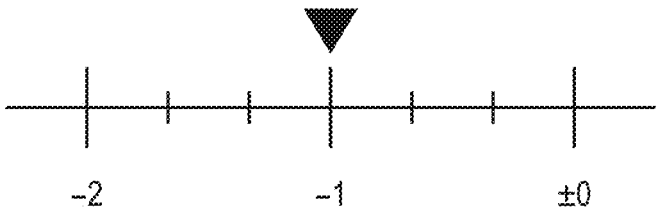
FIG. 11 is a diagram showing a screen for setting an exposure difference according to the modification.

In addition, the user may set the difference between the second exposure amount at the time of shooting a background image and the first exposure amount suitable for shooting a starry sky image. FIG. 11 shows an example of a screen for setting the exposure difference by the user. For example, if −2 is set, the background image is taken with the second exposure amount whose exposure value is smaller by two than the first exposure amount. Also, the exposure difference between a starry sky and a background may be calculated automatically during photometry.

Second Embodiment

Next, a second embodiment of the present invention will be described. In the above-described first embodiment, it is explained that the synthesis of the trail image and the background image/images is realized by performing lighten composite. In the second embodiment, a method of synthesizing images using a mask image will be described.

Figure 12:
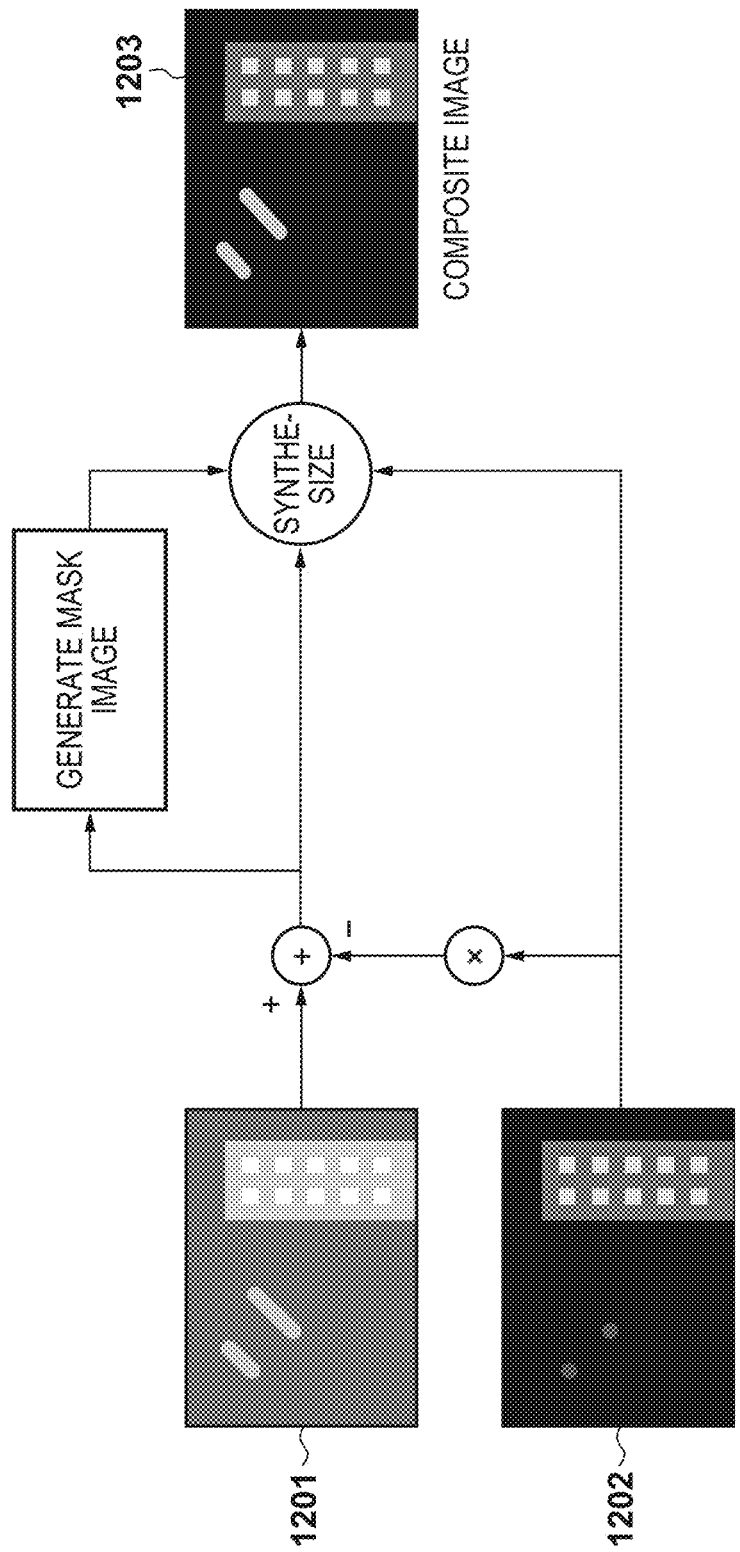
FIG. 12 is a diagram for explaining a method of combining a background image and a trail image according to a second embodiment.

FIG. 12 is a diagram showing a method of synthesizing a background image and a trail image. Here, a case of synthesizing one background image and a trail image will be described. First, in order to control the background image 1202 to have the same exposure level as the trail image 1201, the gain processing corresponding to the number of differences in exposure value is performed in the same manner as described with reference to FIG. 7.

After the gain processing, the background image 1202 undergone the gain processing is subtracted from the trail image 1201, thereby obtaining a trail extraction image (difference image) in which only the trails are extracted. Then, a mask image used for synthesizing the trail extraction image is generated. In the second embodiment, the mask image used for synthesis is generated by extracting a pixel or pixels whose luminance exceeds a predetermined level in the trail extraction image, and filtering signal/signals of the extracted pixel/pixels.

Then, upon synthesizing the background image 1202 which does not undergo the gain processing and the trail extraction image, signals of the trail extraction image are used in the area masked by the mask image, and signals of the background image 1202 are used in the area which is not masked by the mask image. A synthesis ratio is gradually changed at a boundary area so that the boundary is not conspicuous. In this manner, a final composite image 1203 is obtained in which exposure of the starry sky and exposure of the background are both proper.

By performing the synthesis by the method of the second embodiment, similarly to the case where lighten composite is performed in the first embodiment, it is possible to obtain an image in which the trails of stars in the starry sky, the buildings of the background and the night sky respectively have appropriate brightness. Also, since the mask image is used for synthesis, it is possible to synthesize only the necessary part which is composed of the extracted trails of stars in the starry sky, thereby it is possible to obtain a synthesized image without deteriorating noise of the background image.

In the example shown in FIG. 12, the description has been given of a case where the number of background image is one. In a case where a plurality of background images exist, as described with reference to FIG. 8, an averaged background image may be used, or it is possible to select and use a background image as described in the modification. In either case, when synthesizing the background image and the trail extraction image, synthesis is performed by mask processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-238916, filed on Dec. 13, 2017 which is hereby incorporated by reference herein in its entirety.

What is claimed is:

1. An image processing apparatus comprising:
   an acquisition unit that acquires first images that are a plurality of continuous frames obtained by shooting a subject; and
   a synthesis unit that generates a composite image showing a trail of the subject by synthesizing the first images,
   wherein the synthesis unit
   (1) generates a third image by performing lighten composite on second images that are continuous frames acquired with a first exposure amount among the first images;
   (2) acquires a fifth image by performing gain processing on a fourth image, obtained from the first images and having been acquired with a second exposure amount which is lower than the first exposure amount so that the fifth image has a same exposure level as the second images; and
   (3) generates the composite image by performing lighten composite on (a) a difference image, obtained by subtracting the fifth image from the third image, and (b) the fourth image, and
   wherein each unit is implemented by one or more processors, circuitry, or a combination thereof.

2. The image processing apparatus according to claim 1, wherein, in a case where a plurality of images are acquired with the second exposure amount among the first images, the synthesis unit generates the fourth image by averaging these images.

3. The image processing apparatus according to claim 1, wherein, in a case where a plurality of images are acquired with the second exposure amount among the first images, the synthesis unit selects one of these images as the fourth image.

4. The image processing apparatus according to claim 1, wherein the one or more processors, circuitry, or a combination thereof further functions as a selection unit that selects as the fourth image, in a case where a plurality of images are acquired with the second exposure amount among the first images, an image obtained by averaging these images or an image selected from these images.

5. The image processing apparatus according to claim 1, wherein, in a case where a plurality of images are acquired with the second exposure amount among the first images, the synthesis unit processes each of these images as the fourth image, and generates a plurality of the composite images.

6. The image processing apparatus according to claim 1, wherein, in a case where a plurality of images are acquired with the second exposure amount among the first images, the synthesis unit generates the fourth image by averaging these images, and generates the composite image using the generated fourth image.

7. The image processing apparatus according to claim 5, wherein one of the plurality of composite images generated by the synthesis unit is selected and stored.

8. The image processing apparatus according to claim 5, wherein all of the plurality of composite images generated by the synthesis unit are stored.

9. The image processing apparatus according to claim 1, wherein the synthesis unit replaces with 0 a signal level of a pixel which becomes less than 0 when the fifth image is subtracted from the third image.

10. The image processing apparatus according to claim 1, wherein the one or more processors, circuitry, or a combination thereof further functions as a correction unit that performs offset correction on the composite image.

11. An image processing apparatus comprising:
an acquisition unit that acquires first images that are a plurality of continuous frames obtained by shooting a subject; and
a synthesis unit that generates a composite image showing a trail of the subject by synthesizing the first images,
wherein the synthesis unit
(1) generates a third image by performing lighten composite on second images that are continuous frames acquired with a first exposure amount among the first images;
(2) acquires a fifth image by performing gain processing on a fourth image, obtained from the first images and having been acquired with a second exposure amount which is lower than the first exposure amount so that the fifth image has a same exposure level as the second images;
(3) obtains a mask image by extracting a pixel whose luminance exceeds a predetermined level from a difference image obtained by subtracting the fifth image from the third image; and
(4) generates the composite image by replacing an area of the fourth image masked by the mask image et with the fifth image, and
wherein each unit is implemented by one or more processors, circuitry, or a combination thereof.

12. An image capturing apparatus comprising:
(A) an image sensor that converts an optical image into an electric signal and outputs an image;
(B) an image processing apparatus comprising (1) an acquisition unit that acquires first images that are a plurality of continuous frames obtained by shooting a subject, and (2) a synthesis unit that generates a composite image showing a trail of the subject by synthesizing the first images; and
(C) a setting unit that sets an exposure amount,
wherein the synthesis unit
(1) generates a third image by performing lighten composite on second images that are continuous frames acquired with a first exposure amount among the first images;
(2) acquires a fifth image by performing gain processing on a fourth image, obtained from the first images and having been acquired with a second exposure amount which is lower than the first exposure amount so that the fifth image has a same exposure level as the second images; and
(3) generates the composite image by performing lighten composite on (a) a difference image, obtained by subtracting the fifth image from the third image, and (b) the fourth image,
wherein the acquisition unit acquires the first images from the image sensor, and
wherein each unit is implemented by one or more processors, circuitry, or a combination thereof.

13. The image capturing apparatus according to claim 12, wherein the one or more processors, circuitry, or a combination thereof further functions as a selection unit that selects an image shooting mode, and
wherein, in a case where a mode for shooting a trail of light is selected, the processes by the image processing apparatus are performed.

14. The image capturing apparatus according to claim 12, wherein the one or more processors, circuitry, or a combination thereof further functions as:
a designation unit that designates timing for acquiring an image by the acquisition unit with the second exposure amount; and
a control unit that controls the image sensor so as to acquire an image with the second exposure amount at the timing designated by the designation unit.

15. The image capturing apparatus according to claim 14, wherein the designation unit designates either of (a) timing for acquiring an image with the second exposure amount before shooting the first images, (b) timing for acquiring an image with the second exposure amount after shooting the first images, or (c) timing for acquiring images with the second exposure amount before and after shooting the first images.

16. The image capturing apparatus according to claim 12, wherein the one or more processors, circuitry, or a combination thereof further functions as a photometry unit, and
wherein the setting unit sets the second exposure amount based on a photometry result each time an image is shot with the second exposure amount.

17. An image processing method comprising:
acquiring first images that are a plurality of continuous frames obtained by shooting a subject; and
generating a third image by performing lighten composite on second images that are continuous frames acquired with a first exposure amount among the first images;
acquiring a fifth image by performing gain processing on a fourth image, obtained from the first images and having been acquired with a second exposure amount which is lower than the first exposure amount so that the fifth image has a same exposure level as the second images; and
generating a composite image showing a trail of the subject by performing lighten composite on (a) a difference image, obtained by subtracting the fifth image from the third image, and (b) the fourth image.

18. An image processing method comprising:
acquiring first images that are a plurality of continuous frames obtained by shooting a subject; and
generating a third image by performing lighten composite on second images that are continuous frames acquired with a first exposure amount among the first images;
acquiring a fifth image by performing gain processing on a fourth image, obtained from the first images and having been acquired with a second exposure amount which is lower than the first exposure amount so that the fifth image has a same exposure level as the second images;
obtaining a mask image by extracting a pixel whose luminance exceeds a predetermined level from a difference image obtained by subtracting the fifth image from the third image; and
generating a composite image showing a trail of the subject by replacing an area of the fourth image masked by the mask image with the fifth image.

19. A non-transitory storage medium readable by a computer, the storage medium storing a program that is executable by the computer, wherein the program includes program code for causing the computer to function as an image processing apparatus comprising:
an acquisition unit that acquires first images that are a plurality of continuous frames obtained by shooting a subject; and
a synthesis unit that generates a composite image showing a trail of the subject by synthesizing the first images, wherein the synthesis unit
(1) generates a third image by performing lighten composite on second images of a plurality of that are continuous frames acquired with a first exposure amount out of among the first images;
(2) acquires a fifth image by performing gain processing on a fourth image, obtained from the first images and having been acquired with a second exposure amount which is lower than the first exposure amount so that the fifth image has a same exposure level as the second images; and
(3) generates the composite image by performing lighten composite on (a) a difference image, obtained by subtracting the fifth image from the third image, and (b) the fourth image.

20. A non-transitory storage medium readable by a computer, the storage medium storing a program that is executable by the computer, wherein the program includes program code for causing the computer to function as an image processing apparatus comprising:
an acquisition unit that acquires first images that are a plurality of continuous frames obtained by shooting a subject; and
a synthesis unit that generates a composite image showing a trail of the subject by synthesizing the first images,
wherein the synthesis unit
(1) generates a third image by performing lighten composite on second images that are continuous frames acquired with a first exposure amount among the first images;
(2) acquires a fifth image by performing gain processing on a fourth image, obtained from the first images and having been acquired with a second exposure amount which is lower than the first exposure amount, so that the fifth image has a same exposure level as the second images;
(3) obtains a mask image by extracting a pixel whose luminance exceeds a predetermined level from a difference image obtained by subtracting the fifth image from the third image; and
(4) generates the composite image by replacing an area of the fourth image masked by the mask image with the fifth image.

* * * * *